US012765480B2

(12) United States Patent
Miller et al.

(10) Patent No.: US 12,765,480 B2
(45) Date of Patent: Oct. 20, 2026

(54) BACK-UP CONTROL METHODS FOR NETWORKED CONTROLLED MECHANIZED IRRIGATION MACHINE

(71) Applicant: Lindsay Corporation, Omaha, NE (US)

(72) Inventors: Mark William Miller, Elkhorn, NE (US); Luke Joseph Barker, Omaha, NE (US); Steve J. Rubenthaler, Olathe, KS (US); Bradford Ellison, Omaha, NE (US)

(73) Assignee: Lindsay Corporation, Omaha, NE (US)

( * ) Notice: Subject to any disclaimer, the term of this patent is extended or adjusted under 35 U.S.C. 154(b) by 321 days.

(21) Appl. No.: 18/606,684

(22) Filed: Mar. 15, 2024

(65) Prior Publication Data

US 2025/0287890 A1 Sep. 18, 2025

(51) Int. Cl.
*A01G 25/16* (2006.01)
*A01G 25/09* (2006.01)

(52) U.S. Cl.
CPC ........... *A01G 25/16* (2013.01); *A01G 25/092* (2013.01)

(58) Field of Classification Search
CPC .............................. A01G 25/16; A01G 25/092
USPC .......................................................... 700/284
See application file for complete search history.

(56) References Cited

U.S. PATENT DOCUMENTS 10,602,682 B1 * 3/2020 Wardle ................. G05B 19/042

OTHER PUBLICATIONS

"Mechanical Concept on Design and Development of Irrigation System to Help Rural Farmers for Their Agriculture Purpose During Unavailability of External Power" Published by IOP science (Year: 2021).*

* cited by examiner

*Primary Examiner* — Zeina Elchanti
(74) *Attorney, Agent, or Firm* — HOVEY WILLIAMS LLP

(57) ABSTRACT

A control system for relaying signals of an irrigation system comprises a network broker, an end control node, and intermediate control nodes. The network broker is associated with a center of the irrigation system. The end control node is associated with an end mobile tower of the irrigation system. The intermediate control nodes are associated with mobile towers of the irrigation system and linearly connect, via communication lines, the network broker and the end control node. The intermediate control nodes are configured to determine a disconnection between two of the intermediate control nodes, determine whether the mobile towers are operable, and transmit signals representative of operability of the mobile towers, via the communication lines, to the network broker.

16 Claims, 6 Drawing Sheets

BACK-UP CONTROL METHODS FOR NETWORKED CONTROLLED MECHANIZED IRRIGATION MACHINE

BACKGROUND

An irrigation system controller is often connected to other components on an irrigation system via a plurality of discrete wires. The components communicate their status of operation through the wires. For example, a status of a motor on a mobile support tower of an irrigation system may be sent to the controller along a line that directly connects to the controller. However, it is expensive to have a communication line extend from each component of the irrigation system to the controller. Components are therefore often connected to a single bus that connects all components to the controller. However, certain events can cause the bus to become disconnected, which can cripple the operation of the entire irrigation system and leave the controller unable to detect or monitor components of the irrigation system.

The background discussion is intended to provide information related to the present invention which is not necessarily prior art.

SUMMARY OF THE INVENTION

The present invention solves the above-described problems and other problems by providing methods and systems of relaying signals of an irrigation system that enable continued operations after a harmless disconnection and monitoring operations in the event of a disconnection.

A control system for relaying signals of an irrigation system according to an embodiment of the present invention broadly comprises a network broker, an end control node, and intermediate control nodes. The network broker is associated with a center of the irrigation system. The end control node is associated with an end mobile tower of the irrigation system.

The intermediate control nodes are associated with mobile towers of the irrigation system and linearly connect, via communication lines, the network broker and the end control node. The intermediate control nodes are configured to determine a disconnection between two of the intermediate control nodes, determine whether the mobile towers are operable, and transmit signals representative of operability of the mobile towers, via the communication lines, to the network broker. By transmitting signals representative of operability, the network broker can monitor the irrigation system inboard of the disconnection and make determinations on how to proceed. Further, linearly connected control nodes require less material than connecting each control node directly to the controller.

Another embodiment of the invention is a method of controlling an irrigation system. The method comprises determining, via an inboard intermediate control node and an outboard intermediate control node, a disconnection between the inboard intermediate control node and the outboard intermediate control node; transmitting, via the inboard intermediate control node, a signal representative of operability of a mobile tower associated with the inboard intermediate control node; relaying, via a plurality of intermediate control nodes that are inboard of the disconnection, the signal representative of operability of the mobile tower associated with the inboard intermediate control node to a network broker; transmitting, via the outboard intermediate control node, a signal representative of operability of a mobile tower associated with the outboard intermediate control node; and relaying, via a plurality of intermediate control nodes that are outboard of the disconnection, the signal representative of operability of the mobile tower associated with the outboard intermediate control node to an end control node. Relaying the operability of the mobile towers to the end control node and to the network broker enables the irrigation controller to determine whether the irrigation system can continue operations. It also enables the irrigation system to continue operations if the mobile towers are operable.

Another embodiment of the invention is an irrigation system that broadly comprises a first end mobile support tower, intermediate mobile support towers, a second end mobile support tower, truss sections, a fluid-carrying conduit, water emitters, a network broker, an end control node, and intermediate control nodes. The intermediate mobile support towers are adjacent to the first end mobile support tower and are configured to move across a field. At least one of the intermediate mobile support towers includes a motor. The second end mobile support tower is adjacent to the intermediate mobile support towers opposite the first end mobile support tower. The truss sections extend between the first end mobile support tower, the intermediate mobile support towers, and the second end mobile support tower. The fluid-carrying conduit is supported above the field by the truss sections, and the water emitters are coupled with the fluid-carrying conduit. The network broker is supported by the first end mobile support tower, and the end control node is supported by the second end mobile support tower.

The intermediate control nodes are associated with the intermediate mobile support towers and linearly connect, via communication lines, the network broker and the end control node. The intermediate control nodes are configured to determine a disconnection between two of the intermediate control nodes, determine whether the intermediate mobile support towers are operable, and transmit signals representative of operability of the intermediate mobile support towers, via the communication lines, along communications paths away from the disconnection to the end control node and the network broker. Relaying the operability of the mobile towers to the end control node and the network broker enables the irrigation controller to determine whether the irrigation system can continue operations. It also enables the irrigation system to continue operations if the mobile towers are operable.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
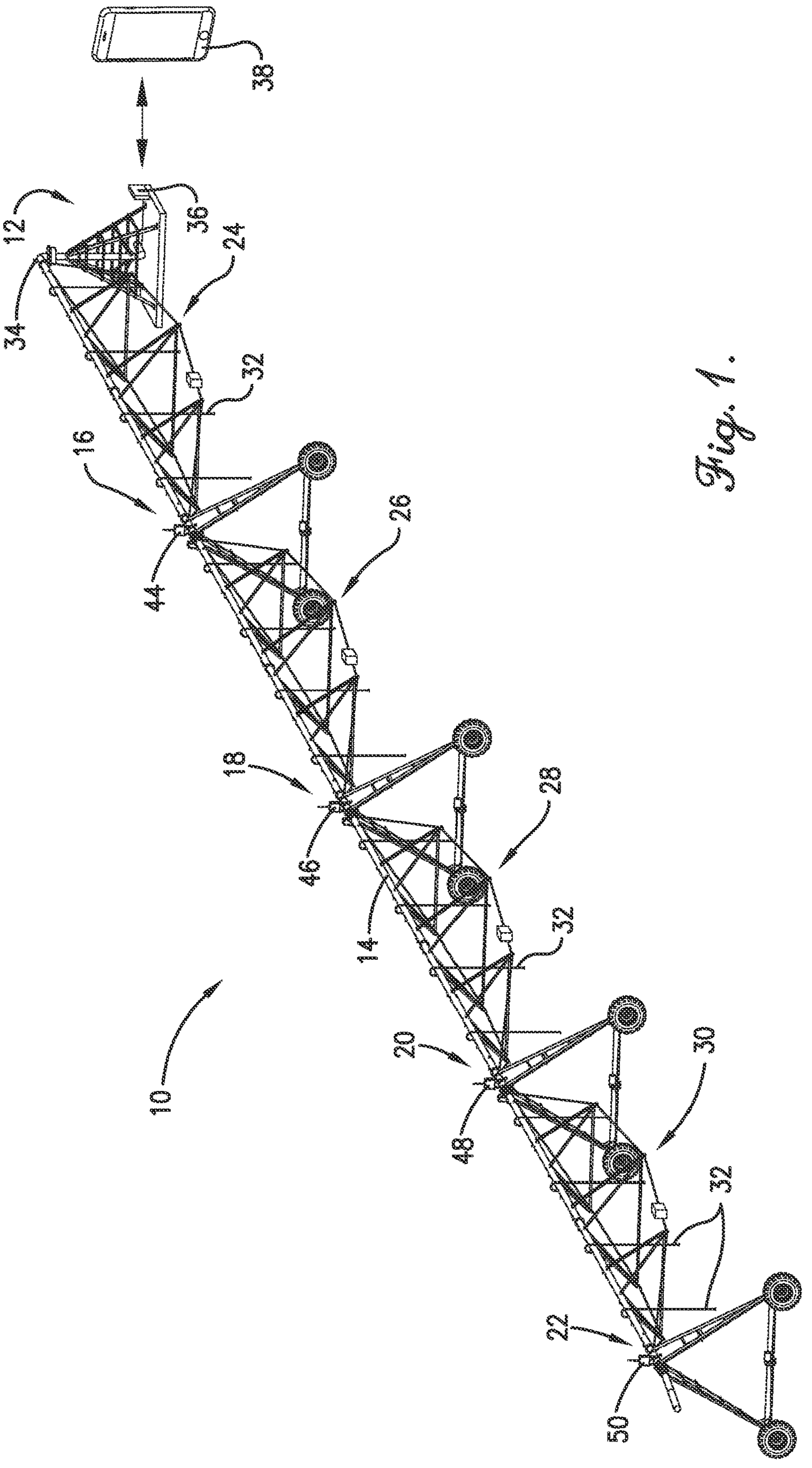
FIG. 1 illustrates an exemplary irrigation system in which embodiments of the present invention may be implemented for relaying data from the irrigation system.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention provide improved technologies for relaying signals along an irrigation system. More particularly, such technologies may include a network for an irrigation system that is operable to enable different types of topologies, including lower-cost daisy chain topologies, and that monitors irrigation system operations and provides back up control procedures in the event of failures, such as disconnections in the network. Embodiments of the network may include a central network broker and a plurality of control nodes at a plurality of mobile support towers of an irrigation system. The broker and nodes are connected, via communication lines, to one another via a bus, a daisy chain topology, and/or a tree topology. If a connection between one or more of the nodes and/or the broker is lost in the wired connection, the system is configured to execute a back-up control process.

In some embodiments, all nodes outboard of the disconnection are configured to transmit a signal, such as a heartbeat signal indicative of connectivity, to an end node. The nodes may be additionally configured to determine whether the motor and/or other components of their respective tower are operational and send a signal that indicates their respective towers are operational. The end node may be configured to determine if all nodes are operational.

If all the nodes are operational, the end node may be configured to have stored the latest operational parameters from the irrigation system controller and determine its location via a location-determining device, such as a global positioning system (GPS) unit. In some embodiments, each node may include wireless communication elements, and the node proximate to the disconnection on the outboard side of the disconnection may be configured to establish wireless communication with the node proximate to the disconnection on the inboard side of the disconnection. The wireless communication may include a signal that all nodes outboard of the disconnection and their towers are operational. The nodes inboard of the disconnection may be configured to relay the notification that all nodes are operational to the network broker, which may be configured to pass this to the controller.

The controller may be configured to wirelessly transmit a notification that the disconnection is present to a remote device. The controller may be configured to receive from the remote device instructions to continue operation, go to a maintenance location, set a designated maintenance location, temporarily pause movement, completely stop operations, and/or the like. The controller may be configured to pass the instructions to the control nodes. The end node may be configured to receive instructions from the inboard nodes through the wireless connection between the nodes proximate to the disconnection and then through the network of the nodes outboard of the disconnection. The end node may be configured to instruct its mobile tower to continue movement, which may be configured to set the pace for the irrigation system. Likewise, the controller may be configured to receive a notification from all nodes that the towers are operational and to direct the nodes inboard of the disconnection to direct the components of their respective towers to continue operations. The end node may be configured to set the pace for the irrigation system to end up at a designated stopping point, such as an end of run location, a maintenance location, or the like.

If not all the nodes are operational and/or if one or more the nodes determine one or more of the components of its respective mobile support towers is not operational, then the nodes outboard of the disconnection may be configured to communicate this to the end node, and the nodes inboard of the disconnection may be configured to communicate this to the broker and thereby the controller. The end node may be configured to direct its tower motor to cease movement, which will stop the entire irrigation machine as the end tower may be configured to set the pace for the whole irrigation system. The controller may be configured to shut power to the entire irrigation system.

In some embodiments, instead of establishing a wireless connection, the nodes inboard of the disconnection report to the broker, and the nodes outboard of the disconnection report to the end node. The controller and the end node may be configured to continue operating if they determine that the nodes reporting to them are operational.

In some embodiments, each of the nodes further include power relays operable to disconnect a power supply line to nodes outboard of it. The nodes may be configured to switch open the relays when an issue is detected so that power is shut off from the end node, which may be configured to set the pace of the irrigation system, and thereby stop operation of the irrigation system.

Specific embodiments of the technology will now be described in connection with the attached drawing figures. The embodiments are intended to describe aspects of the invention in sufficient detail to enable those skilled in the art to practice the invention. Other embodiments may be utilized and changes may be made without departing from the scope of the present invention. The following detail description is, therefore, not to be taken in a limiting sense. The scope of the present invention is defined only by the appended claims, along with the full scope of equivalents to which such claims are entitled.

Exemplary System

Turning to FIG. 1, an exemplary irrigation system 10 for implementing embodiments of the invention is illustrated. The illustrated irrigation system 10 is a pivot irrigation system, but can be any other irrigation system, such as a lateral move irrigation system. The irrigation system 10 may have access to a hydrant, well, water tank, or other source 12 of water and may also be in fluid communication with a tank or other source of agricultural products to inject fertilizers, pesticides, and/or other chemicals into the water for application during irrigation.

The irrigation system 10 may comprise a number of spaced-apart mobile towers 16, 18, 20, 22, a fluid-distribution conduit 14 in fluid communication with the water source 12 and supported by the towers 16, 18, 20, 22 above a field, a plurality of truss sections 24, 26, 28, 30 or other supports to form a number of interconnected spans that help support the conduit 14, a plurality of fluid emitters 32 that are in fluid communication with the conduit 14, one or more valves 34 for controlling flow of fluids to the emitters 32, an irrigation system controller 36 in communication with an external device 38, and an irrigation system network 40 (depicted in FIG. 2) with a network broker 42 (also depicted in FIG. 2) and a plurality of distributed controllers, or control nodes 44, 46, 48, 50.

Figure 2:
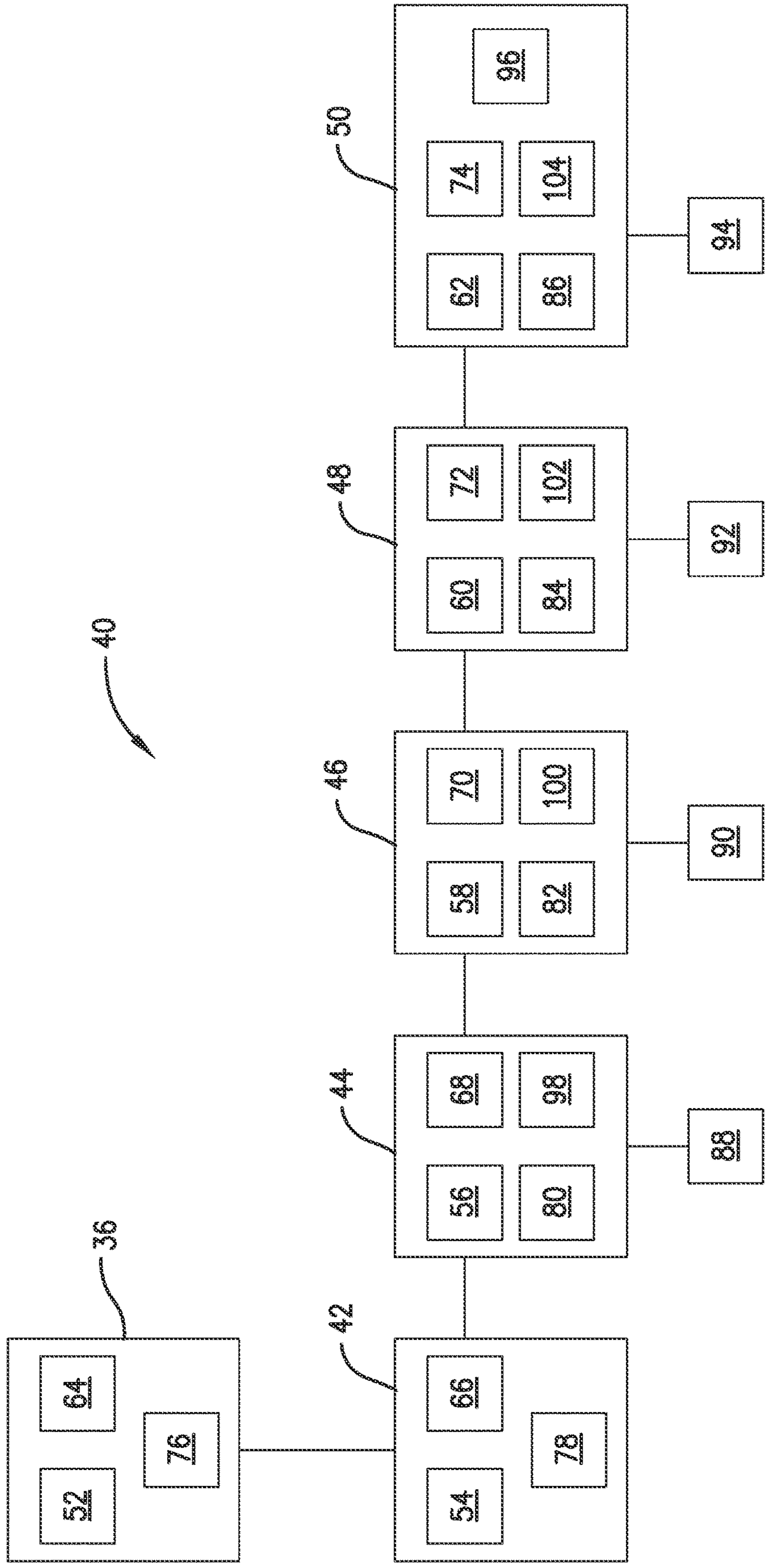
FIG. 2 is a schematic diagram depicting selected components of the irrigation system of FIG. 1 in block schematic form.

Turning to FIG. 2, the irrigation system controller 36 is in communication with the network 40 via the network broker 42. The irrigation system controller 36, the network broker 42, and the control nodes 44, 46, 48, 50 may each comprise a communication element 52, 54, 56, 58, 60, 62, a memory element 64, 66, 68, 70, 72, 74, and a processing element 76, 78, 80, 82, 84, 86.

The communication elements 52, 54, 56, 58, 60, 62 may generally allow communication with systems or devices external to the components in which they reside, such as the irrigation system controller 36, the network broker 42, and/or the control nodes 44, 46, 48, 50. The communication elements 52, 54, 56, 58, 60, 62 may include signal or data transmitting and receiving circuits, such as antennas, amplifiers, filters, mixers, oscillators, digital signal processors (DSPs), and the like. The communication elements 52, 54, 56, 58, 60, 62 may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication elements 52, 54, 56, 58, 60, 62 may be in communication with their respective processing elements 76, 78, 80, 82, 84, 86 and memory elements 64, 66, 68, 70, 72, 74.

The memory elements 64, 66, 68, 70, 72, 74 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory elements 64, 66, 68, 70, 72, 74 may be embedded in, or packaged in the same package as, their respective processing elements 76, 78, 80, 82, 84, 86. The memory elements 64, 66, 68, 70, 72, 74 may include, or may constitute, a "computer-readable medium". The memory elements 64, 66, 68, 70, 72, 74 may store the instructions, code, code segments, software, firmware, programs, applications, apps, services, daemons, or the like that are executed by their respective processing elements 76, 78, 80, 82, 84, 86.

The processing elements 76, 78, 80, 82, 84, 86 may include processors, microprocessors (single-core and multi-core), microcontrollers, DSPs, field-programmable gate arrays (FPGAs), analog and/or digital application-specific integrated circuits (ASICs), or the like, or combinations thereof. The processing elements 76, 78, 80, 82, 84, 86 may generally execute, process, or run instructions, code, code segments, software, firmware, programs, applications, apps, processes, services, daemons, or the like. The processing elements 76, 78, 80, 82, 84, 86 may also include hardware components such as finite-state machines, sequential and combinational logic, and other electronic circuits that can perform the functions necessary for the operation of the current invention. The processing elements 76, 78, 80, 82, 84, 86 may be in communication with the other electronic components through serial or parallel links that include address busses, data busses, control lines, and the like.

The irrigation system controller 36 is configured communicate with the network broker 42 via their respective communication elements 52, 54. The irrigation system controller 36 may be configured to receive operational data from network broker 42 and transmit instructions to the network broker 42. The operational data may comprise metrics related to the operations of the irrigation system 10, including data captured by irrigation system sensors, data related to motor operations, power output, connection status, or the like. The instructions may include operational parameters, such as a designated maintenance location, an end of run location, motor speeds, variable irrigation plans, or the like. The instructions may also include instructions to halt operations of certain components (such as irrigation system motors), instructions to disconnect power, or the like.

The irrigation system controller 36 is also configured to communicate, via its communication element 52, with the external device 38 to relay operational data and/or receive instructions. The irrigation system controller 36 may communicate with the external device 38 via wireless communication, such as cellular communication, so that a remote user can be apprised of status of the irrigation system 10 and provide instructions based on the status, as explained in further detail below.

As depicted, the network 40 may have a daisy chain topology, or be linearly connected, in which communications are relayed from the irrigation system controller 36 to the network broker 42 and downstream to the control nodes 44, 46, 48, 50 via communication lines. The communication lines may comprise conductive wires for transmitting electrical signals, fiber optic cables for passing light pulses, and/or the like. However, the network 40 may have any topology without departing from the scope of the present invention. For example, the network broker 42 may be simultaneously connected to multiple control nodes 44, 46, 48, 50 via communication lines to have a tree topology. Further, one or more of the control nodes 44, 46, 48, 50 may be connected to three or more of the other control nodes 44,

46, 48, 50. While four control nodes are depicted, the network 40 may have any number of control nodes without departing from the scope of the present invention.

The network broker 42 is in communication with the irrigation system controller 36 and the control nodes 44, 46, 48, 50. The network broker 42 may be integrated with the irrigation system controller 36 and/or may be a separate component that is nearby the irrigation system controller 36, such as within close proximity or supported on one of the towers 12, 16. The network broker 42 is configured to relay operational data captured and/or received at the control nodes 44, 46, 48, 50, and pass the operational data to the irrigation system controller 36. The network broker 42 is also configured to receive instructions from the irrigation system controller 36 and pass the instructions to the control nodes 44, 46, 48, 50.

The control nodes 44, 46, 48, 50 are associated with the towers 16, 18, 20, 22 and are configured to relay instructions from the network broker 42 to one another and relay operational data to one another and to the network broker 42. For example, when the network broker 42 receives instructions from the irrigation system controller 36, the network broker 42 may pass the instructions to the first control node 44, which passes the instructions to the second control node 46, and so forth until the end control node 50 receives the instructions. The end control node 50 may be configured to store the latest instructions or operational parameters on its memory element 74. In some embodiments, all the control nodes 44, 46, 48, 50 are configured to store the latest instructions or operational parameters.

Further, the control nodes 44, 46, 48, 50 may each be configured to receive operational data from irrigation system components 88, 90, 92, 94, such as motors, sensors, or the like, located on or near their respective towers 16, 18, 20, 22. The control nodes 44, 46, 48, 50 may be configured to relay the operational data to one another and/or to the network broker 42. For example, the control node 48 may be configured to receive operational data captured by the motor 92 of its mobile tower 20 and transmit the operational data to the end control node 50 and/or the adjacent intermediate control node 46. The intermediate control node 46 may then relay the operational data regarding the motor 92 to intermediate control node 44, which may then relay it to the network broker 42.

The control nodes 44, 46, 48, 50 may also be configured to send "heartbeat signals" to the network broker 42, or periodic signals that indicate the nodes 44, 46, 48, 50 are active and connected to the network 40. Each of the nodes' 44, 46, 48, 50 heartbeat signals may be relayed to the network broker 42 and include a node identifier so that the network broker 42 can determine whether all nodes 44, 46, 48, 50 are connected. For example, the end control node 50 may be configured to send a heartbeat signal along with a node identifier unique to control node 50 to intermediate control node 48, and control node 48 may be configured to relay the signal with the node identifier of control node 50 to control node 46, along with another signal with a node identifier unique to node 48. Control node 46 may be configured to relay these signals and send its own unique identifier to node 44, and so forth, so that the network broker 42 receives heartbeat signals from node 44 that includes heartbeat signals of nodes 46, 48, 50 with their unique identifiers.

Each of the control nodes 44, 46, 48, 50 may also be configured to send heartbeat signals to their adjacent nodes. For example, control node 46 may be configured to send a heartbeat signal to control node 44 and to control node 48. This is one way, according to embodiments of the invention, that the nodes 44, 46, 48, 50 determine connectivity to one another. If the nodes 44, 46, 48, 50 do not receive heartbeat signals from one of their adjacent nodes within a certain time period, the nodes 44, 46, 48, 50 may be configured to conclude a disconnection is present. For example, if node 48 does not receive a heartbeat signal from node 46 after a preprogrammed amount of time, the node 48 may be configured to conclude a disconnection is present between node 48 and node 46.

When a disconnection occurs between one or more of the control nodes 44, 46, 48, 50, the network 40 may be configured to implement a number of back-up control methods. The disconnection could be a communication failure between nodes 44, 46, 48, 50 caused by faulty equipment, damage to one or more communication lines, a short circuit, a loss of power, or the like.

Figure 3:
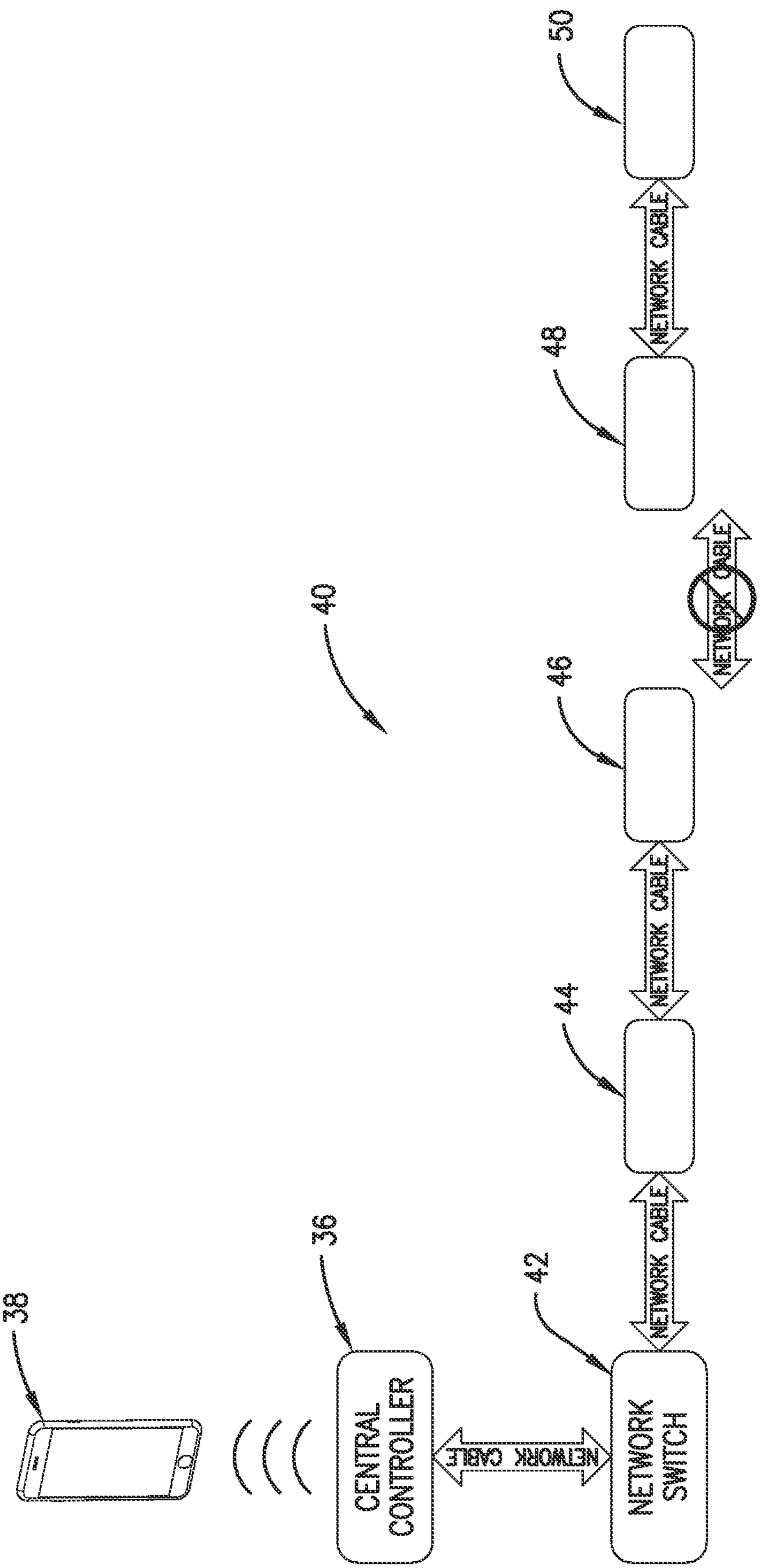
FIG. 3 is a schematic diagram depicting selected components of the irrigation system of FIG. 2 with a disconnection.
Figure 4:
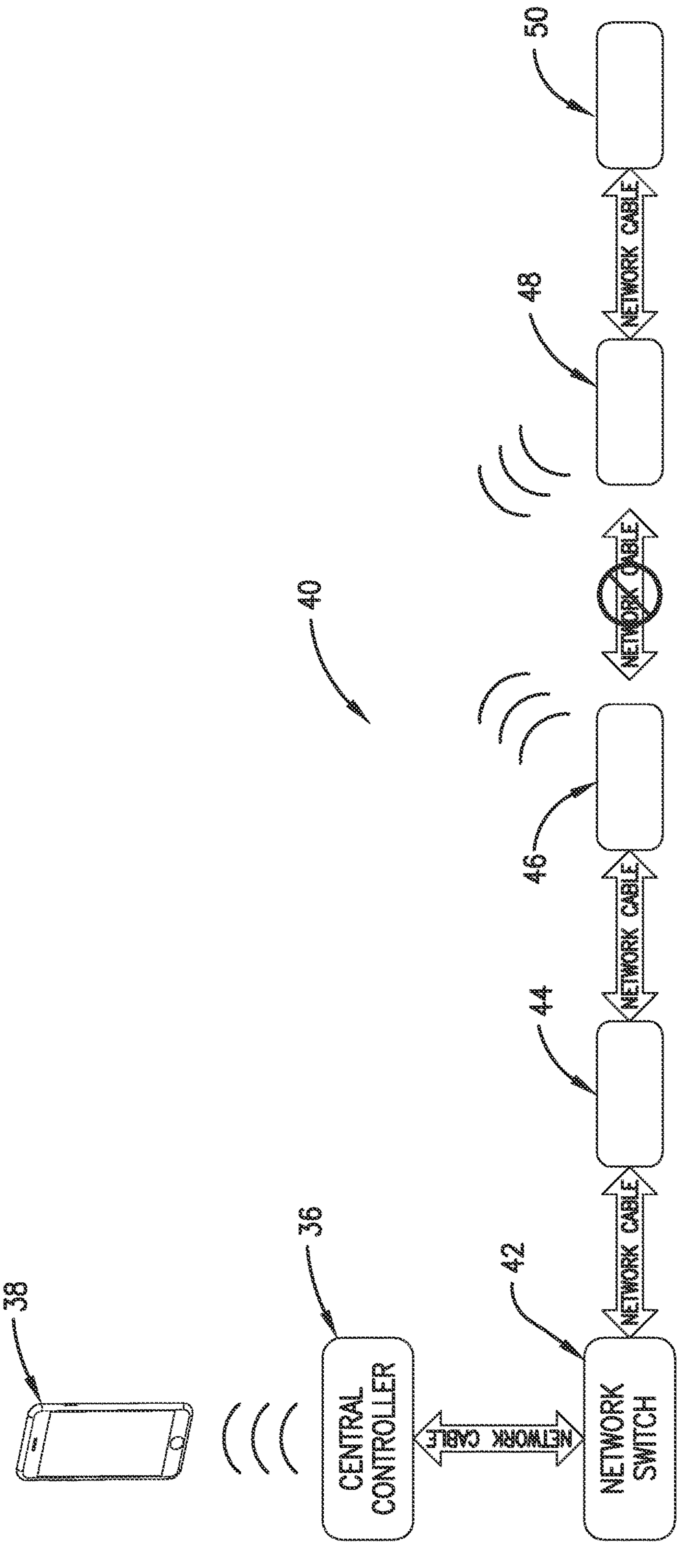
FIG. 4 is a schematic diagram depicting selected components of the irrigation system of FIG. 2 with a wireless connection established between disconnected control nodes.
Figure 5:
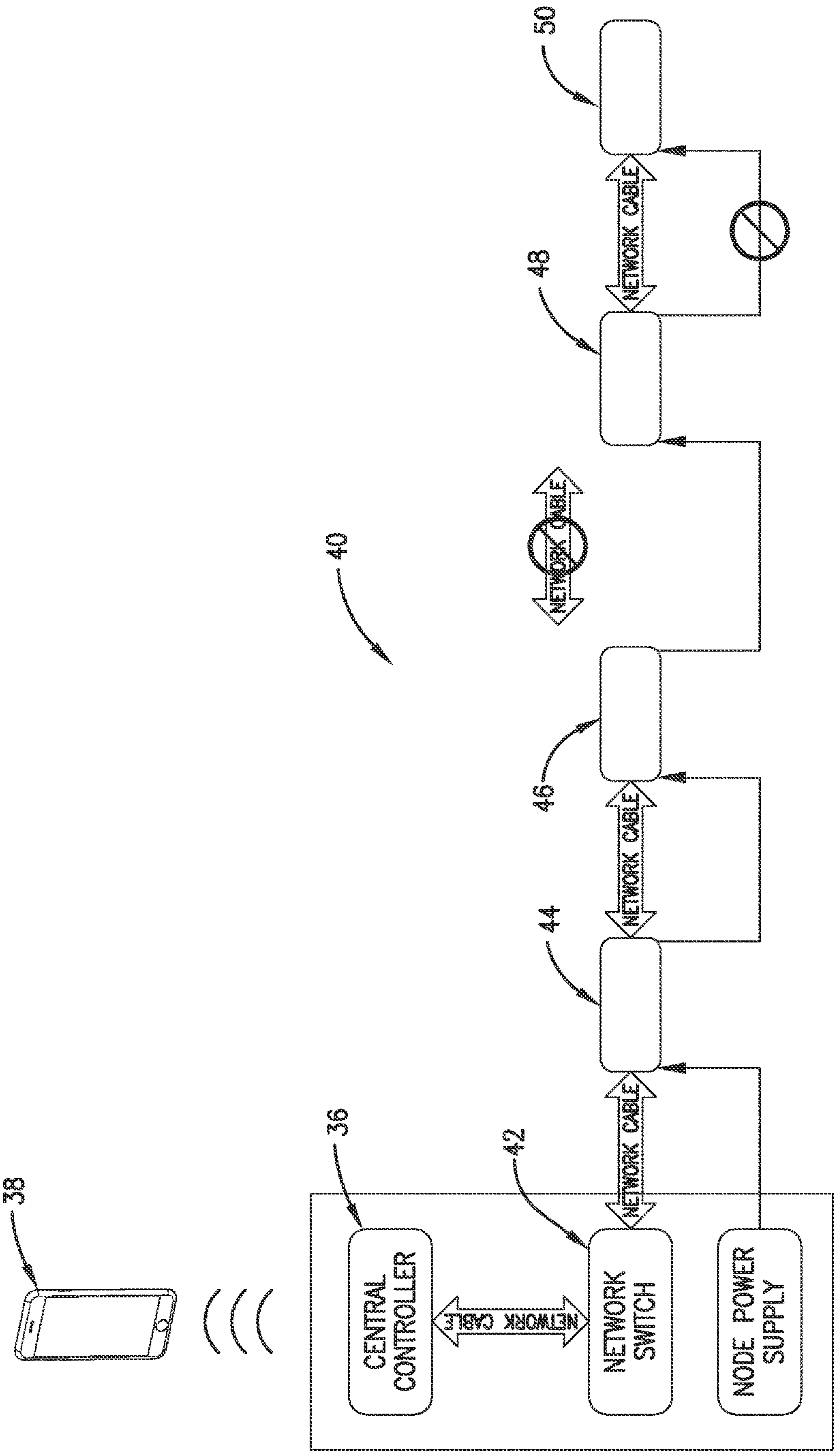
FIG. 5 is a schematic diagram depicting selected components of the irrigation system of FIG. 2 with a power relay disconnecting power to a segment of the irrigation system.

Turning to FIGS. 3-5, example scenarios are depicted in which a disconnection occurs between two specific control nodes. The described processes may be similarly implemented by other control nodes when they experience a disconnection without departing from the scope of the present invention. As depicted in FIG. 3, if a disconnection is present between, for example, intermediate control node 46 and intermediate control node 48, the intermediate control node 46, which is inboard of the disconnection, may be configured to send a signal to control node 44 representative of an indication that a disconnection is present. The indication may include identifying information, such as that the disconnection is immediately outboard of node 46. The control node 46 may further be configured to determine if its corresponding tower 18 and the components 90 associated therewith are operational, functioning properly, and/or whether they report any errors or failures. The control node 46 may be configured to send this information to the control node 44. The control node 44 may pass the indication to the network broker 42, which may be configured to pass it to the irrigation system controller 36.

The irrigation system controller 36 may be configured to transmit a signal to the external device 38 representative of the presence of the disconnection and information associated with the disconnection. The irrigation system controller 36 may be configured to receive instructions from the external device 38 on how to proceed in light of the disconnection. In some embodiments, if no instructions are received and/or while instructions are waiting to be received, the irrigation system controller 36 may be configured to automatically perform one or more functions. For example, the irrigation system controller 36 may be configured to determine whether the control nodes 44, 46, their towers 16, 18, and/or their respective components 88, 90, which are inboard of the disconnection, are operable. If they are operable, the irrigation system controller 36 may be configured to send instructions to the control nodes 44, 46 to direct their respective irrigation system components 88, 90 (such as their motors) to proceed with operations. The irrigation system controller 36 may additionally or alternatively be configured to transmit to the external device 38 whether the control nodes 44, 46, their towers 16, 18, and/or their respective components 88, 90 are operable.

Likewise, the intermediate control node 48 that is outboard of the disconnection may be configured to send a signal to end control node 50 representative of an indication that a disconnection is present. The indication may include identifying information, such as that the disconnection is immediately inboard of node 48. The control node 48 may further be configured to determine if its corresponding tower 20 and the components 92 associated therewith are operational, functioning properly, and/or whether they report any errors or failures. The control node 48 may be configured to send this information to the end control node 50.

The end control node 50 is configured to receive the indication and determine if it is okay to continue operations based at least in part on the signal from control node 48, the latest instructions or operational parameters, and/or the operability of the components 94 of the end tower 22. The end control node 50 may be configured to determine that it is okay to continue operations, retrieve from its memory element 74 the latest instructions or operational parameters, and direct the intermediate control node 48 to continue operations. The end control node 50 may further direct its components 94, such as its motor to continue operations. In some embodiments, the irrigation system 10 is configured so that the end tower 22 sets the pace of movement for the whole irrigation system 10. Thus, when the end control node 50 directs its components 94 of end tower 22 to continue operations, the whole irrigation system 10 moves accordingly. The operational parameters may include a location of the end of run (such as GPS coordinates) for the irrigation system 10, and one or more of the control nodes, such as the end control node 50 may include a position-detection device 96 that is configured to collect data for determining a position of the end control node 50 and/or end tower 22. The position-detection device 96 may comprise a GPS device and/or real-time kinematic (RTK) technology for determining a position of the end control node 50 and/or end tower 22. The end control node 50 may direct its components 94 to continue operations until the position-detection device 96 indicates that the end control node 50 is within a certain threshold of the end of run location.

If the end control node 50 determines that operations cannot continue, it may direct the control node 48 to halt operations. Additionally or alternatively, it may direct the control node 48 to continue some operations, such as operations of the motor 92, until the end control node 50 determines, via its position-detection device 96, that the irrigation system 10 is within a certain distance of a maintenance location. The maintenance location may be a predefined location in the field where the irrigation system 10 is to be located for maintenance. The maintenance location may be part of the operational parameters the irrigation controller 36 provides to the network 40.

Turning to FIG. 4, in some embodiments, the control nodes 44, 46, 48, 50 may additionally or alternatively be configured to establish wireless connections when a disconnection is detected. For example, if intermediate control node 46 and/or intermediate control node 48 detect a disconnection therebetween, then the control nodes 46, 48 may be configured to automatically attempt to establish a wireless connection. Additionally or alternatively, the control nodes 46, 48 may send signals away from the disconnection to the irrigation system controller 36 and/or the end control node 50, and the irrigation system controller 36 and/or the end control node 50 may be configured to direct control node 46 and control node 48, respectively, to attempt to establish a wireless connection with each other via their communication elements 58, 60. Once a wireless connection is established, the nodes 44, 46, 48, 50 may be configured to treat the wireless connection like the communication line. They nodes 44, 46, 48, 50 may be configured to send and relay signals of operability, operational data, instructions, etc.

Turning briefly back to FIG. 2, the control nodes 44, 46, 48, 50 may each further comprise a power relay 98, 100, 102, 104. The power relays 98, 100, 102, 104 may have the same topology as the network 40. The irrigation system controller 36 may provide electricity to the network broker 42, which may provide power to the nodes 44, 46, 48, 50 and/or their components 88, 90, 92, 94 according to the topology of the node communication lines. In some embodiments, the power relays 98, 100, 102, 104 may be connected linearly, or in a daisy chain fashion. In such embodiments, each of the power relays 98, 100, 102, 104 are operable to disconnect all power relays downstream of it. For example, power relay 98 is operable to disconnect the rest of the power relays 100, 102, 104.

Turning to FIG. 5, in some embodiments, if a disconnection is detected between two of the nodes 44, 46, 48, 50, the nodes 44, 46, 48, 50 may be configured to direct their respective power relays 98, 100, 102, 104 to disconnect power to their respective components 88, 90, 92, 94 and/or to downstream nodes. As depicted, when intermediate control node 48 detects a disconnection to intermediate control node 46, control node 48 may be configured to direct its power relay 102 to disconnect power downstream along the network 40, which disconnects power to the end control node 50. In embodiments in which the end tower 22 sets the pace of the irrigation system 10, this results in the entire irrigation system 10 halting movement.

Exemplary Method

Figure 6:
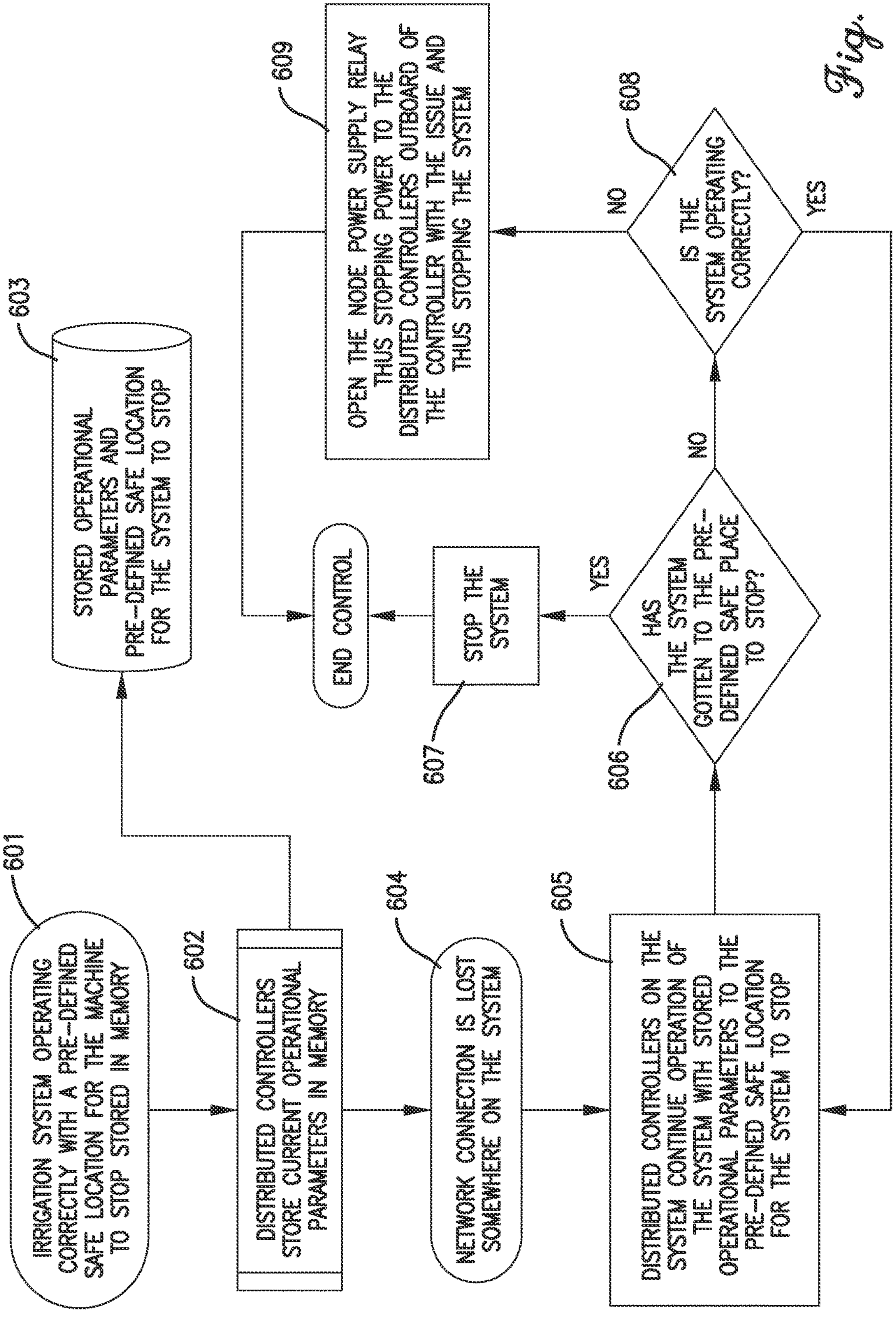
FIG. 6 is a flowchart depicting exemplary steps of a method according to an embodiment of the present invention.

The flow chart of FIG. 6 depicts the steps of an exemplary method 600 of relaying data of an irrigation system. In some alternative implementations, the functions noted in the various blocks may occur out of the order depicted in FIG. 6. For example, two blocks shown in succession in FIG. 6 may in fact be executed substantially concurrently, or the blocks may sometimes be executed in the reverse order depending upon the functionality involved. In addition, some steps may be optional.

The method 600 is described below, for ease of reference, as being executed by exemplary devices and components introduced with the embodiments illustrated in FIGS. 1-5. The steps of the method 600 may be performed by the irrigation system controller 36, the network broker 42, and/or the control nodes 44, 46, 48, 50 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 601, the irrigation system operates normally with the network distributing operational parameters and data among the control nodes and the irrigation system controller. The irrigation system controller is configured to receive instructions from the external device and transmit the instructions to the network, which distributes the instruction among the distributed controllers or control nodes. Further, operational data captured by components in electronic communication with the control nodes is relayed among the control nodes and passed to the irrigation system controller. The irrigation system controller passes the operational data to the external device via wireless communication through its communication element.

Referring to step 602, the distributed controllers or control nodes store the current operational parameters. In some embodiments, one or more of the control nodes store the operational parameters, and in some embodiments, each of the control nodes store the operational parameters. Referring to step 603, the operational parameters include a designated safe location for the irrigation system to stop. The safe location may be the end of run location or a maintenance location.

Referring to step 604, a connection between two or more control nodes in the network is lost. This may be due to an equipment failure, wear and tear on connections, damage to the irrigation system, a power outage, or the like. The control nodes may detect the disconnection any number of ways, including by determining that a heartbeat signal is not received from one or more of the control nodes.

Referring to step 605, the control nodes continue operation of the irrigation system based at least in part on the operational parameters stored on one or more of their memory elements. The irrigation system controller, the network broker, and/or one of the control nodes inboard of the disconnection may provide the latest operational parameters to the rest of the control nodes inboard of the disconnection. Similarly, the end control node and/or one or more of the other control nodes outboard of the disconnection may have stored the latest operating parameters. The stored operating parameters are then provided to the rest of the control nodes outboard of the disconnection. The control nodes direct their respective irrigation system components associated with their mobile support towers to continue operations in accordance with the latest operational parameters.

In some embodiments, this step includes establishing a wireless connection between the control nodes experiencing the disconnection. The operational parameters may be received from the irrigation system controller, transmitted to the network broker, relayed through the control nodes, and passed through the wireless connection. Further, operational data may be received at control nodes outboard of the disconnection, passed through the wireless connection, and relayed via the control nodes inboard of the disconnection to the irrigation system controller. The irrigation system controller may receive instructions or adjustments to the operational parameters from the external device and transmit those to the network, which passes them to the control nodes outboard of the disconnection via the established wireless connection.

Referring to step 606, the control nodes and/or the irrigation system controller determine whether the irrigation system is at the designated safe location. One or more of the control nodes and/or the irrigation system controller may include position-detecting devices that detect the location thereof. For example, the position-detecting devices may be GPS receivers, and the operational parameters may include GPS coordinates of the safe location. The control nodes may compare a current set of coordinates received from the GPS receivers with the GPS coordinates of the safe location to determine whether the irrigation system is at the safe location. Referring to step 607, if the irrigation system is already at the safe location, then the irrigation system controller and/or the control nodes may discontinue operations of the irrigation system.

Referring to step 608, if the irrigation system is not at the safe location, then the control nodes check to see the operational status of the irrigation system components, such as motors, associated with their respective mobile support towers. The control nodes may check to see if any errors or reports have been thrown by motor controllers, sensors, or the like. If everything is operating correctly in spite of the disconnection, the inboard control nodes may indicate this to the irrigation system controller. The control nodes outboard of the disconnection may also indicate correction operation to the end control node. If everything is operating correctly, then the control nodes direct components to continue operations, as indicated in step 605. In some embodiments, the control nodes and/or irrigation system controller assume operability and continue operations after a disconnection until a signal is received indicative of incorrect operation. In some embodiments, the irrigation system controller and/or the control nodes wait to continue operations until a signal is provided from each control node that components are operational.

Referring to step 609, if the irrigation system controller and/or the control nodes determine that one or more of the irrigation system components are not operating correctly, then the irrigation system controller and/or the control nodes may shut down power to one or more irrigation system components. In some embodiments, the control node reporting the issue sends a control signal to its control node power relay, which disconnects electric power to the components of the associated mobile tower and to components outboard of that control node.

The method 600 may include additional, less, or alternate steps and/or device(s), including those discussed elsewhere herein.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A control system for relaying signals of an irrigation system having mobile towers, the control system comprising:

a network broker associated with a center of the irrigation system;

an end control node associated with an end mobile tower of mobile towers; and intermediate control nodes associated with the mobile towers, the intermediate control nodes linearly connecting, via communication lines, the network broker and the end control node and being configured to— determine a disconnection between two of the intermediate control nodes, determine whether the mobile towers are operable, and transmit signals representative of operability of the mobile towers, via the communication lines, to the network broker.

2. The control system of claim 1, wherein the network broker is configured to— receive a signal representative of operability of the mobile towers, and transmit a signal representative of an instruction to continue irrigation system operations.

3. The control system of claim 2, wherein the intermediate control nodes are configured to transmit signals representative of operability of mobile towers, via communication lines, to the end control node, and the end control node is configured to— receive a signal representative of operability of the mobile towers, and transmit a signal representative of an instruction to continue irrigation system operations.

4. The control system of claim 3, wherein the end control node is configured to— store a latest set of operational parameters, and transmit the signal representative of the instruction in accordance with the set of operational parameters.

5. The control system of claim 4, wherein the operational parameters include GPS coordinates for an end of run location, and the end control node includes a GPS configured to determine a current location.

6. The control system of claim 5, wherein the end of run location is a user-designated maintenance location.

7. The control system of claim 1, wherein the network broker is configured to— determine at least one of the mobile towers is not operable, and transmit a signal representative of an instruction to halt an irrigation system operation.

8. The control system of claim 1, wherein the end control node is configured to— determine at least one of the mobile towers is not operable, and transmit a signal representative of an instruction to halt an irrigation system operation.

9. The control system of claim 1, wherein two of the intermediate control nodes adjacent to the disconnection are configured to establish a wireless connection between the two of the intermediate control nodes.

10. The control system of claim 9, wherein the network broker and the end control node are configured to establish communication via the intermediate control nodes and the wireless connection between the two of the intermediate control nodes.

11. The control system of claim 1, wherein the network broker is configured to receive a signal representative of operability of the mobile towers, and wirelessly transmit a signal representative of a disconnection notice to a remote device.

12. The control system of claim 1, wherein the intermediate control nodes include power relays, and the intermediate control nodes are configured to determine at least one of the mobile towers is not operable, and send a control signal at least one of the power relays to shut down power to the end control node.

13. An irrigation system comprising:

a first end mobile support tower;

intermediate mobile support towers adjacent to the first end mobile support tower and configured to move across a field, one or more of the intermediate mobile support towers having a motor;

a second end mobile support tower adjacent to the intermediate mobile support towers opposite the first end mobile support tower;

truss sections extending between the first end mobile support tower, the intermediate mobile support towers, and the second end mobile support tower;

a fluid-carrying conduit supported above the field by the truss sections;

water emitters coupled with the fluid-carrying conduit;

a network broker supported by the first end mobile support tower;

an end control node supported by the second end mobile support tower; and intermediate control nodes associated with the intermediate mobile support towers, the intermediate control nodes linearly connecting, via communication lines, the network broker and the end control node and being configured to— determine a disconnection between two of the intermediate control nodes, determine whether the intermediate mobile support towers are operable, and transmit signals representative of operability of the intermediate mobile support towers, via the communication lines, along communications paths away from the disconnection to the end control node and the network broker.

14. The irrigation system of claim 13, wherein:

the network broker is configured to— receive the signals representative of operability of the intermediate mobile support towers, and transmit a signal representative of an instruction to continue irrigation system operations; and the end control node is configured to— receive the signals representative of operability of the intermediate mobile support towers, and transmit a signal representative of an instruction to continue irrigation system operations.

15. The irrigation system of claim 13, wherein the two of the intermediate control nodes on either side of the disconnection are configured to wirelessly communicate with one another.

16. The irrigation system of claim 13, further comprising:

power cables extending between the intermediate mobile support towers; and relays connecting the power cables in series, wherein the intermediate control nodes are configured to send control signals to the relays to disconnect the power cables.

* * * * *